Dec. 26, 1950 J. E. MITCHELL 2,535,746
SWIVELED STEPPED BOBBIN FISHING REEL
Filed March 12, 1947 2 Sheets-Sheet 1

INVENTOR,
JOHN E. MITCHELL,
By Herbert A. McInture
ATTORNEY.

Dec. 26, 1950   J. E. MITCHELL   2,535,746
SWIVELED STEPPED BOBBIN FISHING REEL
Filed March 12, 1947   2 Sheets-Sheet 2

INVENTOR,
JOHN E. MITCHELL,
By Herbert A. Minturn,
ATTORNEY.

Patented Dec. 26, 1950

2,535,746

UNITED STATES PATENT OFFICE 2,535,746

SWIVELED STEPPED BOBBIN FISHING REEL

John E. Mitchell, Indianapolis, Ind.

Application March 12, 1947, Serial No. 734,089

13 Claims. (Cl. 242—84.1)

This invention relates to a fishing reel wherein the line bobbin has a plurality of stepped spools reducing in diameter from the base to the outer end of the bobbin, and wherein the bobbin is positioned to have its axis parallel to the axis of the pole for normal casting; and to have the bobbin axis shiftable to a position at right angles to the pole axis for rewinding the line on the bobbin.

A primary object of the invention is to provide a reel wherein the bobbin may remain stationary as the line feeds therefrom such as in a casting operation; and wherein the bobbin will permit the line to be fed therefrom without a tendency to backlash.

A further primary object of the invention is to provide a structure not only incorporating the above object but which may be quickly placed in a rewinding condition at the end of the cast.

Figure 1:
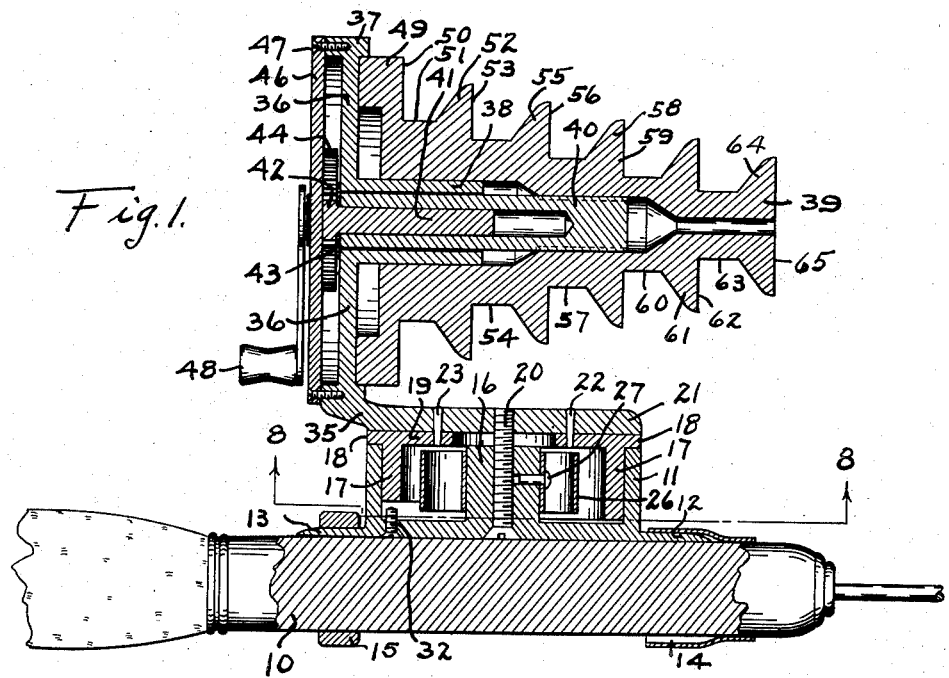
Figures 2, 3, 4:
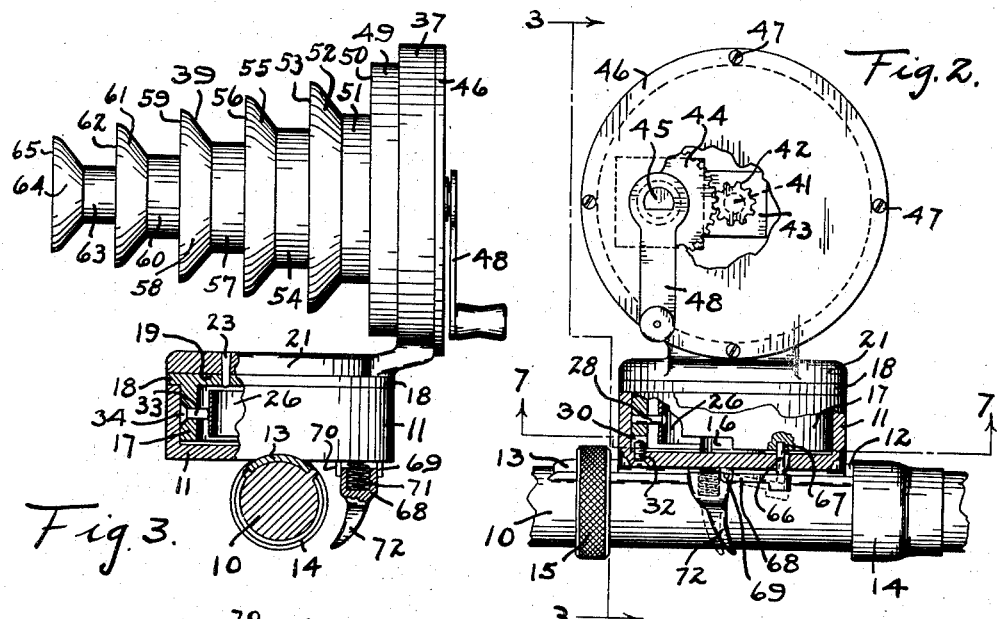
Figure 5:
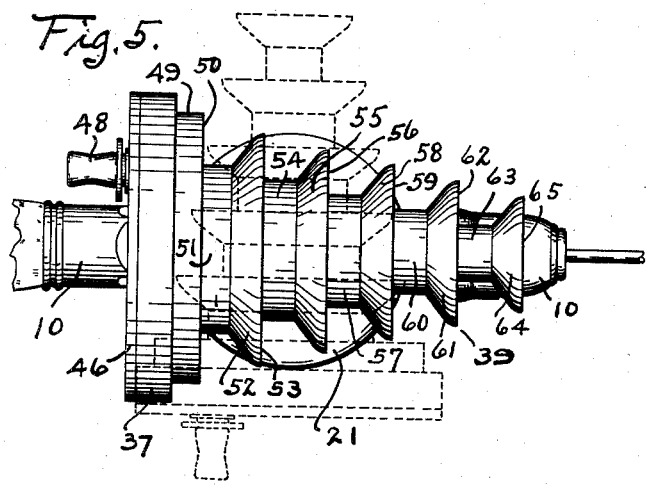
Figure 6:
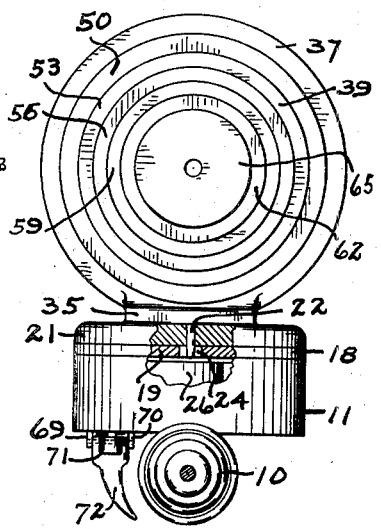
Figure 7:
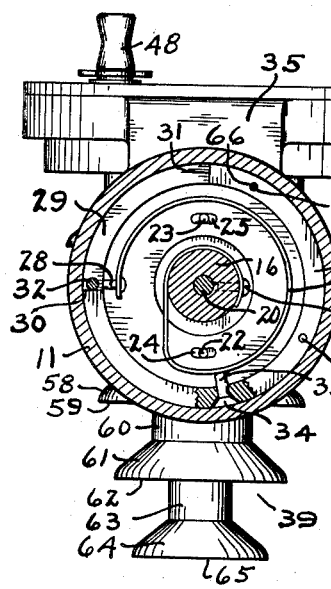

These and many other advantages of the invention including simple means for level winding of the line on each of the steps of the bobbin, and the simplified structure for revolving the bobbin from the unwinding to the winding position, will become apparent to those versed in the art in the following description of one particular form of the invention as illustrated in the accompanying drawings, in which Fig. 1 is a view in vertical longitudinal section showing a structure embodying the invention and mounted upon the handle of a pole;

Fig. 2, a view in side elevation and partial section of the reel with the bobbin revolved from the position shown in Fig. 1 to the rewinding position;

Fig. 3, a view in rear elevation and partial section with the bobbin in the rewind position as viewed from the section line 3—3 in Fig. 2;

Fig. 4, a detail in top plan view of a trigger release lever;

Fig. 5, a view in top plan with the bobbin in the position indicated in Fig. 1;

Fig. 6, a view in front elevation and partial section;

Fig. 7, a view in horizontal section on the line 7—7, Fig. 2, and

Figure 8:
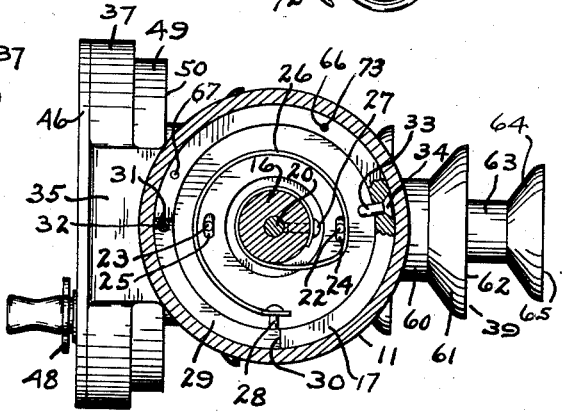

Fig. 8, a similar view on the line 8—8, Fig. 1, with the bobbin turned to have its axis in the casting position.

Referring to the drawings in which like characters of reference indicate like parts, the structure illustrated as embodying the invention may be mounted in the usual manner upon the handle 10 of a pole by having a base 11 rest on the handle and have fore and aft members 12 and 13 be engaged respectively under the ferrule 14 and the sliding ring 15. The base 11 is essentially a cylindrical cup provided with a central pedestal 16 extended upwardly substantially to the plane of the top edge of the wall of the base.

A sleeve 17 is formed to telescope with a sliding fit within the base 11. The sleeve 17, in the present form, has an outwardly extending flange 18 to bear around on the top end of the wall of the base 11. The sleeve 17 also has an inwardly extending flange 19. This sleeve 17 is revolubly retained in position by means of a screw 20 extended through the pedestal 16 and screw-threadedly engaged to the base plate 21. The base plate 21 carries one or more pins, herein shown as two, 22 and 23, which extend downwardly to enter slots 24 and 25, respectively provided through diametrically opposite portions of the flange 19. A spring 26 has one end secured by a pin 27 to the pedestal 16. The spring 26 wraps around the pedestal 16 from the pin 27 to extend substantially tangentially therefrom and then curve around the pedestal 16 in spaced relation between it and the inside of the sleeve 17, to have the other end of the spring 26 fixed by a pin 28 to the sleeve 17. The under edge portion of the sleeve 17 is provided with a notch 29 to leave abutments 30 and 31 at the ends thereof substantially 90 degrees apart, Figs. 7 and 8. A pin, herein shown as a screw 32, extends upwardly from the floor of the base 11 to be in the paths of these abutments 30 and 31. This pin 32 is positioned against the abutment 31 when the sleeve 17 is turned in the direction of winding the spring 26 around the pedestal 16, and to be against the abutment 30 upon reverse travel of the sleeve 17.

A brake pin 33 extends radially through the side wall of the sleeve 17 with a free sliding fit. The outer end of the pin 33 is preferably provided with an enlarged end to bear against the inside of the wall of the base 11. This enlargement in the present showing consists of a head 34 which limits the inward travel of the pin 33. The pin 33 extends inwardly from the wall of the sleeve 17 to bear against the spring 27, Fig. 7, when the abutment 30 is against the pin 32. The spring 26 in this relative position of the sleeve 17 with the base 11 exerts considerable pressure against the pin 33 to set up a condition slowing down travel of the sleeve relative to the base plate 21 to that position indicated in Figs. 2 and 3, as well as Fig. 7. With the base plate 21 revolved to bring the abutment 31 against the pin 32, Fig. 8, the spring 26 is retracted from the pin 33 due to the fact that the spring 26 has been pulled inwardly toward the pedestal 16.

The base plate 21 has an arm 35 extending from one side thereof to merge into an upwardly extending reel plate 36. This plate 36 has a circular peripheral band 37 extending rearwardly and forwardly respectively from the faces of the plate 36. A tubular boss 38 extends axially from the forward face of the plate 36. The reel bobbin generally designated by the numeral 39 has a central shaft revolubly carried by a rear portion within the boss 38. In the form herein shown, the reel 39 is counter bored to rotatably fit around the outside of the boss 38. The shaft 40 is shown to be a part separate from the reel 39 and has its forward end pressed into a reduced diameter bore in the reel 39. The shaft 40 in turn is axially bored from its rear end to receive by a pressed fit the stem 41 of a pinion gear 42. Preferably some sort of a bearing plate such as the washer 43 is inserted between the pinion gear 42 and the rear face of the plate 36.

A pinion gear 44 of a diameter larger than that of the gear 42 is mounted on a shaft 45 which revolubly extends through the cover 46. The cover 46 is secured against the head 37 by any suitable means such as by a plurality of screws 47. The shaft 45 extends rearwardly from the cover 46 and has fixed thereon the crank 48, whereby turning of the crank 48 will, through the gears 44 and 42, revolve the reel 39. The purpose of the extension of the head 37 rearwardly from the plate 36 is to provide space and clearance between the plate 36 and the cover 46 for the intervening gears 42 and 44.

The bobbin 39 has a very significant conformation of its base end. The bobbin has a cylindrical portion 49 with a forward face 50 in a plane normal to the axis of the bobbin 39. A cylindrical portion extends forwardly from the face 50 by a short length such as ¼ of an inch, the diameter of this portion being 1.30 inches. Then from the forward end of this cylindrical section 51, the bobbin flares outwardly and forwardly in a conical manner terminating through a short radius such as ⅛ of an inch at a forward face 53, this flared portion being designated by the numeral 52. This slope, thus defined in conjunction with the radius at the face end is of great importance. The face 53 is parallel to the face 50. The longitudinal length of this portion 52 is ¼ of an inch from the end of the portion 51 to the face 53, which is 1.80 inches in diameter.

From the face 53, the bobbin 39 continues forwardly by a cylindrical portion 54 having a diameter of 1.10 inches, and a length of ¼ inch. A frusto-conical portion 55 extends forward from the forward end of the portion 54 to have a major diameter of 1.60 inches, this portion 55 having its sloping side merging into a ⅛ inch radius to the forward face 56, that is the slope of this portion 55 and the radius at the outer end thereof are exactly the same as in the portion 52. From the face 56, the bobbin continues through a smaller diameter cylindrical section 57, having a diameter of .860 inch and a length of ¼ of an inch. A frusto-conical section 58 continues from the section 57 to be ¼ of an inch in longitudinal length which is the same length as for all of these frusto-conical sections of the bobbin. Also the slope to and the outer radius at the forward face 59 of the section 58 are the same as that in all of the conical sections.

A cylindrical section 60 having a diameter of .620 inch and in length ¼ inch extends forwardly from the face 59 to have a frusto-conical section 61 extended therefrom into a forward 62 having the diameter of 1.120 inches. Incidentally the diameter of the face 59 is 1.360 inches. The cylindrical section 63 has a diameter of .360 inch, extending forwardly from the face 62 to carry finally on its outer end the frusto-conical section 64 which merges into the outer end face 65 having a diameter of .860 inch. As indicated, each of the cylindrical sections is ¼ of an inch in length and likewise each of the frusto-conical sections is ¼ of an inch in length. All of the surfaces of these sections are preferably polished to facilitate free sliding of a line thereover. Material deviations from the relative dimensions of any of the various parts of the bobbin 39 may detract from the free flow of the line as it leaves the reel upon casting. The radii at the junctures of the forward faces of the conical sections are extremely important. In other words there must be a larger conical surface flared outwardly from each cylindrical surface rather than having any of these flared surfaces to be wholly spherical or continued through a radius rather than straight line elements.

Now, as above indicated, the spring 26 tends to pull the axis of the bobbin 39 to a position at right angles to the axis of the pole handle 10. In order to maintain the axis of the bobbin parallel to the axis of the handle 10 I provide a trigger pin 66, Fig. 2, to enter freely through the floor of the base 11 to have its upper end in the path of the lower end of the sleeve 17. The sleeve 17 is provided with a hole 67 entering from its under side at that position where the pin 66 may enter that hole and thus maintain the axis of the bobbin 39 at right angles of the axis of the pole handle 10. This pin 66 is carried on a trigger arm 68 pivoted on the under side of the base 11 in any suitable manner herein shown as between the ears 69 and 70 to carry a spring 71 between it and the base 11 normally urging the pin 66 upwardly. A depending trigger 72 is provided to extend preferably down along one side of the handle 10 whereby the pin 66 may be pulled downwardly out of engagement with the sleeve 17, and thereby permit the spring 26 to pull the bobbin 39 from the casting position around to the re-wind position with its axis at right angles to the axis of the handle 10 where the pressure of the spring 26 will push the pin 33 into frictional engagement with the wall of the base 11 and thereby automatically brake the bobbin in that re-wind position. To return the bobbin to the casting position, all that is required is to pull the trigger 72, grasp the bobbin and revolve it 90 degrees to bring the abutment 31 against the stop pin 32 as above described in which position the pin 66 will drop into a sleeve hole 73 and thereby retain the bobbin fixed in that casting position until the trigger 72 is pulled rearwardly. In addition to the holding effect of the spring 26 pushing the pin 33 outwardly to urge its head 34 into frictional engagement with the base wall 11, a positive holding of the sleeve 17 in that re-wind position may be provided by means of the second hole 67 entering from the under side of the sleeve 17. Figs. 2, 7 and 8, whereby the pin 66 may enter the hole 67 when the sleeve is revolved to bring the abutment 30 against the pin 32, Figs. 2 and 7. In Fig. 2, the pin 66 is shown as being entered in the hole 67 so as to hold the sleeve 17 in the re-wind position of the bobbin.

With the reel in the re-wind position, Fig. 3, the line (not shown) is initially wound about the smaller diameter bobbin section 63 and is successively carried up across the rear face in each instance and down around the next succeeding diameter section, and finally finished winding on the larger section 51. In winding on each cylindrical section, the bobbin axis will oscillate in a horizontal plane within the limits permitted by the pins 22 and 23 striking the ends of the slots 24 and 25. This oscillatory motion is induced by the operator as he turns the crank 48. During a complete revolution of the crank 48 the operator will automatically rock the axis of the bobbin 39 by pulling the crank face toward him and then away from him as he turns the crank. In this oscillatory action the axis of the bobbin tilts just enough to feed the line uniformly across the length of each cylindrical section to level wind the line. Therefore no attention has to be given the winding of the line on any one of the cylindrical sections. It is necessary to lift the line from one section to the next larger section.

In casting, the line feeds first from the cylindrical section 51 to slide over the conical section 52 and then successively feeds from the succeeding sections to permit the full feed required for the bait casting. Since the bobbin 39 is not revolving, there is no tendency for the bobbin to overrun and thereby back-wind the line. Furthermore by reason of the peculiarly shaped flanges between each of the cylindrical sections, and also by the stepped relationship of the cylindrical portions, the line is fed outwardly under the pull of the bait with the minimum possible retardation of the flow of the line making it practically impossible for the line to become entangled about the reel. Following the casting operation, the trigger 72 is pulled to cause the bobbin to take the re-wind position immediately so that the operator is in a position to control the alternate winding in and letting out of the line as he may desire or as may be desired in playing a fish.

While I have herein shown and described my invention in the one particular form it is obvious that structural changes may be made without departing from the spirit of the invention particularly in the dimensions which have been given as an example only and not as limiting the invention thereto. The relations between those dimensions are to be preserved however. Therefore I do not desire to be limited to that precise form beyond the limits which may be imposed by the following claims.

I claim:

1. In a reel, a cylindrical base member; a sleeve rotatably telescoping in said member; a reel bobbin mounted on said sleeve, a spring interconnecting said member and said sleeve; a stop member carried by said base member to hold said sleeve in a position rotated to wind said spring substantially ninety degrees of travel from an initial normal position; said initial postion being a rewind position; and said rotated position being a line casting position; a crank at one bobbin end for revolving the bobbin; and said bobbin having a plurality of cylindrical sections decreasing successively in diameter from said bobbin end, and a frusto-conical section between adjacent cylindrical sections, each arranged to have its small diameter end at the end of the larger diameter cylindrical section from which it extends.

2. In a reel, a cylindrical base member; a sleeve rotatably telescoping in said member; a reel bobbin mounted on said sleeve; a spring interconnecting said member and said sleeve; a stop member carried by said base member to hold said sleeve in a position rotated to wind said spring substantially ninety degrees of travel from an initial normal position; said initial position being a rewind position; and said rotated position being a line casting position; a crank at one bobbin end for revolving the bobbin; and said bobbin having a plurality of cylindrical sections decreasing successively in diameter from said bobbin end, and a frusto-conical section between adjacent cylindrical sections, each arranged to have its small diameter end at the end of the larger diameter cylindrical section from which it extends; said mounting of the bobbin on said sleeve comprising a base plate shiftably carried by the sleeve, and a pin and slot connection between said base plate and said sleeve, whereby turning of said crank will oscillate said bobbin within the limits of travel of said pin in said slot.

3. In a reel, a cylindrical base member; a sleeve rotatably telescoping in said member; a reel bobbin mounted on said sleeve; a spring interconnecting said member and said sleeve; a stop member carried by said base member to hold said sleeve in a position rotated to wind said spring substantially ninety degrees of travel from an initial normal position; said initial position being a rewind position; and said rotated position being a line casting position; a crank at one bobbin end for revolving the bobbin; and said bobbin having a plurality of cylindrical sections decreasing successively in diameter from said bobbin end, and a frusto-conical section between adjacent cylindrical sections, each arranged to have its small diameter end at the end of the larger diameter cylindrical section from which it extends; said base member comprising a cylindrical wall and a central pedestal spaced therefrom; said spring having one end fixed to said pedestal to wind therearound in spaced relation in part at least and be fixed by its other end to said sleeve; and said sleeve telescoping within said wall.

4. In a reel, a cylindrical base member; a sleeve rotatably telescoping in said member; a reel bobbin mounted on said sleeve; a spring interconnecting said member and said sleeve; a stop member carried by said base member to hold said sleeve in a position rotated to wind said spring substantially ninety degrees of travel from an initial normal position; said initial position being a rewind position, and said rotated position being a line casting position; a crank at one bobbin end for revolving the bobbin; and said bobbin having a plurality of cylindrical sections decreasing successively in diameter from said bobbin end, and a frusto-conical section between adjacent cylindrical sections, each arranged to have its small diameter end at the end of the larger diameter cylindrical section from which it extends; said base member comprising a cylindrical wall and a central pedestal spaced therefrom; said spring having one end fixed to said pedestal to wind therearound in spaced relation in part at least and be fixed by its other end to said sleeve; and said sleeve telescoping within said wall; and a brake pin carried by said sleeve to extend slidingly therethrough; said pin having a length to be in the path of said spring when said sleeve approaches said normal position whereby the unwinding spring will urge said pin longitudinally against said wall to set up a braking action, the spring upon being wound to said ninety degree position being free of said pin.

5. In a reel, a cylindrical base member; a sleeve rotatably telescoping in said member; a reel bobbin mounted on said sleeve; a spring interconnecting said member and said sleeve; a stop member carried by said base member to hold said sleeve in a position rotated to wind said spring substantially ninety degrees of travel from an initial normal position; said initial position being a rewind position, and said rotated position being a line casting position; a crank at one bobbin end for revolving the bobbin; and said bobbin having a plurality of cylindrical sections decreasing in diameter from said bobbin end; and a frustoconical section between adjacent cylindrical sections, each arranged to have its small diameter end at the end of the larger diameter cylindrical section from which it extends; said stop member comprising a pin carried by said base member, spring means urging the stop pin toward said sleeve, said sleeve having an abutment against which the stop pin is entered by said spring means when said ninety degrees of travel is effected, and a trigger connected with said pin to withdraw the pin to subject said sleeve to a return travel by pull of said first spring.

6. In a reel, a cylindrical base member, a sleeve rotatably telescoping in said member; a reel bobbin mounted on said sleeve; a spring interconnecting said member and said sleeve; a stop member carried by said base member to hold said sleeve in a position rotated to wind said spring substantially ninety degrees of travel from an initial normal position; said initial position being a rewind position, and said rotated position being a line casting position; a crank at one bobbin end for revolving the bobbin; and said bobbin having a plurality of cylindrical sections decreasing successively in diameter from said bobbin end, and a frusto-conical section between adjacent cylindrical sections, each arranged to have its small diameter end at the end of the larger diameter cylindrical section from which it extends; said stop member comprising a pin carried by said base member, spring means urging the stop pin toward said sleeve, said sleeve having an abutment against which the stop is entered by said spring means when said ninety degrees of travel is effected, and a trigger connected with said pin to withdraw the pin to subject said sleeve to a return travel by pull of said first spring; and means limiting travel of said sleeve relation to said base member to substantially ninety degrees rotation.

7. A reel having a pole mounting base; a bobbin; a bracket carrying said bobbin and swivelled on said base; a crank for revolving the bobbin from one end; said bobbin having a plurality of cylindrical sections decreasing successively in diameter from said end, a frusto-conical section between each of adjacent cylindrical sections with the base end of the conical sections at the next smaller diameter cylindrical section, the bases of the conical sections being in planes normal to the longitudinal axis of the bobbin.

8. A reel having a pole mounting base; a bobbin; a bracket carrying said bobbin and swivelled on said base; a crank for revolving the bobbin from one end; said bobbin having a plurality of cylindrical sections decreasing successively in diameter from said end; a frusto-conical section between each of adjacent cylindrical sections with the base end of the conical sections at the next smaller diameter cylindrical section; the bases of the conical sections being in planes normal to the longitudinal axis of the bobbin; the longitudinal lengths of all of said sections including cylindrical and frusto-conical sections being of an equal number of units.

9. In a reel, a bobbin having a plurality of longitudinally spaced apart cylindrical lands; around which line may be wrapped, each successive land from one end being of a smaller diameter than that of the preceding land; and a frusto-conical flange between adjacent lands, the major diameter of each flange being at the beginning of the next smaller land, the larger land merging into the minor diameter end of the flange in each instance.

10. In a reel, a bobbin having a plurality of longitudinally spaced apart cylindrical lands; around which a line may be wrapped, each successive land from one end being of a smaller diameter than that of the preceding land; and a frusto-conical flange between adjacent lands, the major diameter of each flange being at the beginning of the next smaller diameter land, the larger land merging into the minor diameter end of the flange in each instance; the major diameter end of each of said flanges having a face in a plane normal to the bobbin axis.

11. In a reel, a bobbin having a plurality of longitudinally spaced apart cylindrical lands; around which a line may be wrapped, each successive land from one end being of a smaller diameter than that of the preceding land; and a frusto-conical flange between adjacent lands, the major diameter of each flange being at the beginning of the next smaller diameter land, the larger land merging into the minor diameter end of the flange in each instance; the major diameter end of each of said flanges having a face in a plane normal to the bobbin axis; all of said lands having an equal number of units of longitudinal length, and all of said flanges having an equal number of units of longitudinal length.

12. In a reel, a bobbin having a plurality of longitudinally spaced apart cylindrical lands, around which a line may be wrapped, each successive land from one end being of a smaller diameter than that of the preceding land; and a frusto-conical flange between adjacent lands, the major diameter of each flange being at the beginning of the next smaller diameter land, the larger land merging into the minor diameter end of the flange in each instance; the major diameter end of each of said flanges having a face in a plane normal to the bobbin axis; all of said lands having an equal number of units of longitudinal length, and all of said flanges having an equal number of units of longitudinal length; and each flange having a major diameter exceeding the diameter of its immediately preceding land by twice the longitudinal length of a land, said land and flange lengths being equal to each other.

13. In a reel, a bobbin having a plurality of longitudinally spaced apart cylindrical lands, around which a line may be wrapped, each successive land from one end being of a smaller diameter than that of the preceding land, and a frusto-conical flange between adjacent lands, the major diameter of each flange being at the beginning of the next smaller diameter land, the larger land merging into the minor diameter end of the flange in each instance; the major diameter end of each of said flanges having a face in a plane normal to the bobbin axis; all of said lands having an equal number of units of longitudinal length, and all of said flanges having an equal number of units of longitudinal length;

and each flange having a major diameter exceeding the diameter of its immediately preceding land by twice the longitudinal length of a land, said land and flange length being equal to each other; said major diameter of each flange being determined at the junction with said face of a continuation of the conical face of the flange through a curved portion, the center of the radius of curvature of which is in said face, the radius being one-half of the longitudinal length of a land long.

JOHN E. MITCHELL.

REFERENCES CITED

The following references are of record in the file of this patent:

UNITED STATES PATENTS

| Number | Name | Date |
|---|---|---|
| 1,114,084 | Wells | Oct. 20, 1914 |
| 2,363,533 | King | Nov. 28, 1944 |

FOREIGN PATENTS

| Number | Country | Date |
|---|---|---|
| 813,087 | France | Feb. 15, 1937 |